US010223615B2

United States Patent
Ma et al.

(10) Patent No.: US 10,223,615 B2
(45) Date of Patent: Mar. 5, 2019

(54) LEARNING BASED DEFECT CLASSIFICATION

(71) Applicant: Dongfang Jingyuan Electron Limited, Beijing (CN)

(72) Inventors: Weimin Ma, Beijing (CN); Jian Zhang, San Jose, CA (US); Zhaoli Zhang, Beijing (CN)

(73) Assignee: Dongfang Jingyuan Electron Limited, Beijing (CN)

( * ) Notice: Subject to any disclaimer, the term of this patent is extended or adjusted under 35 U.S.C. 154(b) by 225 days.

(21) Appl. No.: 15/285,667

(22) Filed: Oct. 5, 2016

(65) Prior Publication Data

US 2018/0060702 A1 Mar. 1, 2018

Related U.S. Application Data

(63) Continuation of application No. PCT/CN2016/097171, filed on Aug. 29, 2016.

(30) Foreign Application Priority Data

Aug. 23, 2016 (CN) .......................... 2016 1 0707841

(51) Int. Cl.
*G06K 9/62* (2006.01)
*G06T 7/00* (2017.01)

(52) U.S. Cl.
CPC ......... *G06K 9/6269* (2013.01); *G06K 9/6228* (2013.01); *G06T 7/0004* (2013.01); *G06K 2209/19* (2013.01); *G06T 2207/30148* (2013.01)

(58) Field of Classification Search
CPC ................ G06K 9/6269; G06T 7/0004; G06T 2207/3014
See application file for complete search history.

(56) References Cited

U.S. PATENT DOCUMENTS

| 6,999,614 | B1 | 2/2006 | Bakker et al. | |
|---|---|---|---|---|
| 9,430,743 | B2 * | 8/2016 | Plihal | G06T 7/001 |
| 2017/0330315 | A1 * | 11/2017 | Okuda | G06T 7/001 |
| 2017/0352145 | A1 * | 12/2017 | Dhagat | G06T 7/0006 |

FOREIGN PATENT DOCUMENTS

| CN | 102680102 A | 9/2012 |
|---|---|---|
| CN | 104008550 A | 8/2014 |
| CN | 104198497 A | 12/2014 |
| CN | 104850858 A | 8/2015 |
| CN | 105320945 A | 2/2016 |

\* cited by examiner

*Primary Examiner* — Phuoc Tran
(74) *Attorney, Agent, or Firm* — Young Basile Hanlon & MacFarlane, P.C.

(57) ABSTRACT

Methods, apparatuses and systems for classifying defects for a defect inspection system are disclosed. The defect inspection system can be used to inspect and manage wafer or reticle defects. The method includes receiving a defect record based on an inspection of a target specimen, the defect record comprising a defect image associated with an unknown defect, selecting, by a computing device using a first processing unit, components ranked by significance from the defect image using a first learning technique, and determining, by the computing device using the first processing unit, whether the defect image is associated with a known defect type based on the components ranked by significance using a second learning technique.

19 Claims, 4 Drawing Sheets

LEARNING BASED DEFECT CLASSIFICATION

CROSS REFERENCE TO RELATED APPLICATION(S)

This application claims priority to Chinese application No. 201610707841.5, filed on Aug. 23, 2016, and is a continuation of International patent application No. PCT/CN2016/097171, filed on Aug. 29, 2016, the contents of both of which are incorporated herein by reference in their entireties.

TECHNICAL FIELD

This disclosure generally relates to defect classifications for wafer or reticle inspection.

BACKGROUND

Wafer or reticle defect inspection systems with capability of defect classification have been widely used in semiconductor manufacturing. With the technology progressing into finer resolutions such as beyond 20 nm, increasing number of defects can be caused by various system conditions, e.g., process variation, and OPC techniques. The ever-increasing systematic defects can lead to lower performances.

Machine learning techniques can be used for defect classification. However, increasing number and data size of defects can cause performance deterioration, such as lower accuracy or longer processing time.

SUMMARY

Disclosed herein is a method for learning based defect classification for a wafer or reticle defect inspection system. The method includes receiving a defect record based on an inspection of a target specimen, the defect record comprising a defect image associated with an unknown defect, selecting, by a computing device using a first processing unit, components ranked by significance from the defect image using a first learning technique, and determining whether the defect image is associated with a known defect type based on the components ranked by significance using a second learning technique, by the computing device using the first processing unit.

Also disclosed herein is a non-transitory computer-readable medium storing a set of instructions. When executed by a computer system using a first processing unit, the instructions become operational with the first processing unit for learning based defect classification. The non-transitory computer readable medium includes instructions to receive a defect record based on an inspection of a target specimen, the defect record comprising a defect image associated with an unknown defect, select components ranked by significance from the defect image using a first learning technique, and determine whether the defect image is associated with a known defect type based on the components ranked by significance using a second learning technique.

Also disclosed herein is a defect inspection system. The system includes a first processing unit, a second processing unit, and a memory coupled to the first and the second processing units and configured to store a set of instructions. When executed by the first and the second processing units, the instructions become operational with the first and the second processing units to receive, using the first processing unit, a defect record based on an inspection of a target specimen, the defect record comprising a defect image associated with an unknown defect, select, using the first processing unit, components ranked by significance from the defect image using a first learning technique, wherein the components ranked by significance are determined using both the first processing unit and the second processing unit, and determine whether the defect image is associated with a known defect type based on the components ranked by significance using a second learning technique using both the first processing unit and the second processing unit.

Details of these implementations, modifications of these implementations, and additional implementations are described below.

BRIEF DESCRIPTION OF THE DRAWINGS

The disclosure is best understood from the following detailed description when read in conjunction with the accompanying drawings. The description herein makes reference to the accompanying drawings, where like reference numerals refer to like parts throughout the several views.

DETAILED DESCRIPTION

Figure 1:
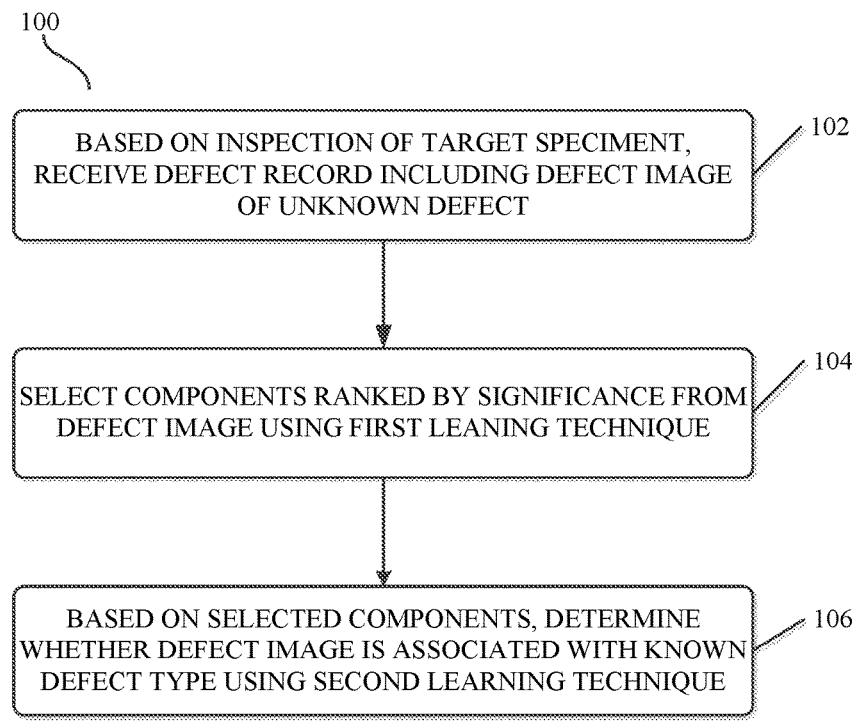
FIG. 1 is a flow diagram showing an example process of learning based defect classification according to implementations of this disclosure.

Defect inspection systems have been used in semiconductor manufacturing to detect and classify defects on wafers or reticles. For example, a wafer defect inspection system can detect defects on the wafers, and obtain relevant information about the defects, such as images ("defect images") and position coordinates of the defects. In defect classification, a label can be assigned to a defect after analyzing the characteristics of a defect image associated with the defect. By assigning a correct label to a detected defect, pre-defined course of action can be quickly implemented to handle the defect, the wafer, or the reticle on the production line. Further, analysis of defects based on classifications can guide the formulation of remedial plan to improve the process and yield.

An inspection can be performed on a wafer or a reticle ("target specimen") to generate the defect record. According to implementations of this disclosure, during the defect classification process, objectives can be obtained from the defect inspection systems and used as input for defect classification process. The objectives can include, for example, defect records, which can be any data received based on the inspection of a target specimen (e.g., a wafer or reticle). The defect records can include defect images, for example.

Often times, objectives used as input for the defect classification process include components that are not crucial for the classification process. For an objective (e.g., defect image), some components can be determined to have higher significance and therefore higher impact on the classification process than the other components. For example, certain pixels of a defect image can be more determinative than the others for detecting and/or classifying the defect image into different defect patterns. According to implementations of this disclosure, components of an objective can be ranked and selected by significance for further processing, using machine learning techniques, such as support vector machine techniques, at a component selection stage. The selected components can be used as input to a knowledge development stage for a defect classification training process, using, for example, deep learning techniques. The output from the knowledge development stage can be used to tune the parameters of the component selection stage and/or the knowledge development stage.

Once the accumulated knowledge from the knowledge development stage meets testing requirements, defects detected by the defect inspection system can be classified using the trained parameters for classification, without requiring the users to extract features or select samples in advance. The testing requirements can be predefined and/or adjusted based on previous results. The accumulated knowledge can include, for example, trained parameters from the knowledge development stage and/or the component selection stage.

In implementations of this disclosure, different (machine) learning techniques are selected for different stages to reduce computation time and cost, and to increase accuracy. Additional processing resources (e.g., GPU), which are often optimized for image processing, can be added to help achieve better performance. Once sufficient defect records are available to train the knowledge base of the defect classification process (e.g., parameters for the learning techniques), various types of defect patterns can be detected and classified with flexibility. Other details are described below after first describing an environment in which the disclosure may be implemented.

FIG. 1 is a flow diagram showing an example process of learning based defect classification for a wafer or reticle defect inspection system, according to implementations of this disclosure. Process 100 depicted in FIG. 1 may be performed by software modules (e.g., instructions or code) executed by a processor of a computer system, by hardware modules of the computer system, or combinations thereof. The computer system can include, for example, one or more computing devices. One or more operations described herein can be incorporated into, for example, wafer or reticle inspection products and be used by a semiconductor manufacturer.

Figure 4:
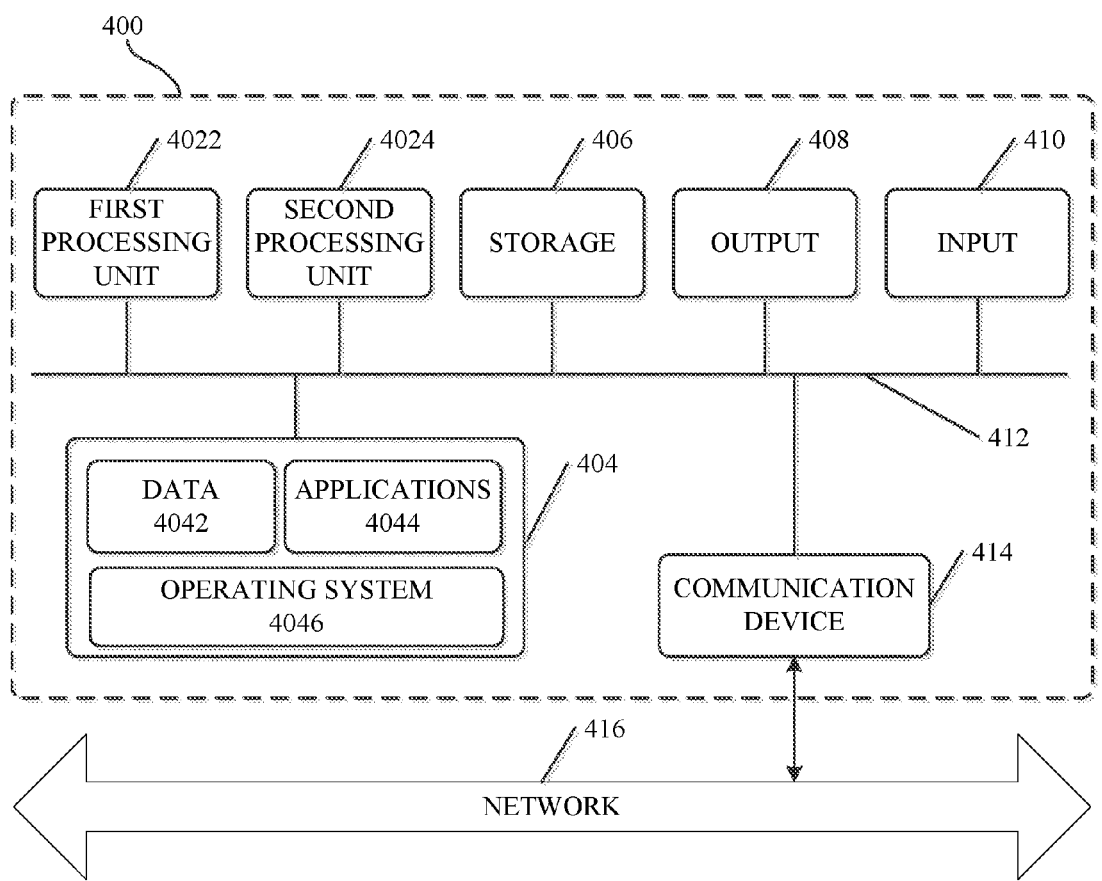
FIG. 4 is a diagram of an example defect inspection system according to implementations of this disclosure.

The software modules can include machine-readable instructions that can be stored in a memory such as memory 401 shown in FIG. 4. The machine-readable instructions can be executed by a processor, such as CPU 402 or GPU 403, to cause the computing device to perform process 100. The one or more computing devices can be implemented as an apparatus included in the defect inspection system, which will be discussed in FIG. 4. Process 100 can be implemented using specialized hardware or firmware. Some computing devices can have multiple memories, multiple processors, or both. For example, the operations of process 100 can be distributed using different processors (such as CPU 402 and GPU 403 in FIG. 4). Use of the terms "processor" or "memory" in the singular encompasses computing devices that have one processor or one memory as well as devices that have multiple processors or multiple memories that can each be used in the performance of some or all of the recited operations. Process 100 is also referred to as "classification process" (different from the "training process" described in FIG. 2). For simplicity of explanation, process 100 is depicted and described as a series of operations. However, operations in accordance with this disclosure can occur in various orders and/or concurrently. Additionally, operations in accordance with this disclosure may occur with other operations not presented and described herein. Furthermore, not all illustrated operations may be required to implement a method in accordance with the disclosed subject matter.

During the defect classification process, objectives can be obtained from the defect inspection systems and used as input for defect classification process. The objectives can include, for example, defect records, which can be any data received based on the inspection of a target specimen (e.g., a wafer or reticle). The defect records can include defect images, for example. Prior to starting process 100, a training process 200 can be performed to train the knowledge base of the learning based defect classification system (or component). The training process 200 can include establishing models and/or updating parameters of the first and second learning techniques to be used in process 100, in order to achieve more accurate results for defect classification. The training process 200 will be further discussed in FIGS. 2 and 3A-B.

At operation 102, a defect record is received based on an inspection of a target specimen, in which the defect record can include a defect image associated with an unknown defect. The target specimen can include, for example, a wafer or a reticle. An inspection can be performed on the target specimen to generate the defect record. The inspection can include, for example, an optical or an E-beam inspection. The defect record can be part of an inspection report, and can include one or more defects. Each defect can include, for example, location and image information. The location can include data about the location of the defect, such as layer information and coordinates. The defect image and/or location can be extracted from the defect record. "Receiving" as used herein can refer to receiving, inputting, acquiring, retrieving, obtaining, reading, accessing, determining, or in any manner getting data, such as the defect record.

In some implementations, the defect image can be raw image data from inspection. As discussed above, the inspection can be an optical inspection or an E-beam inspection. When the inspection is an optical inspection, the defect image can be an optical image of the defect (from the optical inspection), which can be similar to a die-to-database inspection. When the inspection is an E-beam inspection, the defect image can be a SEM image (from the E-beam inspection) of the defect.

At operation 104 ("component selection stage"), components ranked by significance are selected from the defect image using a first learning technique, by a computing device. The components can include, for example, data from the defect image that can be used for defect classification, such as, for example, image data (e.g., pixels). For example, a component can include a pixel, a super pixel, a group or a block (or subblock) of pixels etc. The components can also include position data (e.g., coordinates of regions), or parts (e.g., edges, corners, segments, regions or key positions) of the defect image, which can also be used for defect classification.

A first (machine) learning technique, such as, for example, a support vector machine (SVM) technique can be used to select the components. The components can be ranked based on, for example, a significance value determined using the SVM technique. For example, a top portion (e.g., top ten components ranked by weighted significance)

of all ranked components can be selected. Other techniques can also be used to select the components.

Significance can be specified in numerical values, e.g., significance values, and can include, for example, relevancy, importance or impact information of a component for defect classification. For example, a significance value can be based on, for example, probabilities or statistical frequencies of a component that a defect can occur in. In some implementations, the components can be assigned with weights, and selected based on weighted significance values. The components can be sorted or grouped according to the significance (e.g., relevancy, importance or impact) for defect classification. "Ranked by" or "ranking" as used here can refer to determine a subset of components from components of an objective (e.g., a defect image) based on significance (e.g., significance values). The selected components can be ranked, or unranked, as long as the subset of components is selected based on some sort of significance (e.g., relevancy, importance or impact) to the classification process.

The remaining components (not selected) are often regarded as not significant, or not critical for defect classification, which can be discarded or ignored, so as to reduce the size of input data for the subsequent operations. Without significantly compromising useful information for defect classification, classification efficiency and performance can be improved.

In some implementations, the one or more computing devices can include a first processing unit and a second processing unit. "Processing unit" and "processor" are used interchangeably to refer to any type of device, or multiple devices, capable of manipulating or processing information. Although the examples herein can be practiced with a single processing unit as shown, advantages in speed and efficiency can be achieved using more than one processing unit. The processing unit can be distributed across multiple machines or devices (each machine or device having one or more of processing units) that can be coupled directly or across a local area or other network. In some implementations, for example, the first processing unit can include a central processing unit (CPU), and the second processing unit can include a graphics processing unit (GPU). Component selection stage such as operations 104 and 204 can be performed by the first processing unit (e.g., CPU), the second processing unit (e.g., GPU), or both. In cases of using multiple processing units, higher efficiency and better performance can be achieved by utilizing additional processing resources (e.g., GPU), which are often optimized for image processing.

At operation 106, it is determined, using a second learning technique, whether the defect image is associated with a known defect type based on the components ranked by significance selected at operation 104, by the computing device. Defects can be classified into defect groups such as system defects and random defects. Defects can also be classified by types such as, for example, breaks, bridges, holes, irregular shapes, or exceeding certain tolerance. The selected components can be used as inputs to a trained knowledge base that has met the testing requirements, using the second learning technique, as discussed further in FIGS. 2 and 3A-B.

In some implementations, the second learning technique can include a deep learning (DL) technique. The DL technique, as either supervised or unsupervised, can work as a DL model taking one or more inputs (e.g., images) and providing one or more outputs (e.g., labels). Further, the DL model can have a capability of classifying images, such as outputting a textual, numerical or symbolic label for an input image. Output labels from a pre-determined, limited group can be selected prior to a training process for the DL model (see, e.g., FIG. 2). Various DL models can be used as image classifiers, such as convolutional neural networks (CNN), deep belief networks, stacked denoising auto-encoders, or deep Boltzmann machines. However, implementations of the second learning technique are not limited to DL techniques. Other techniques for image processing can be used in place of, or in combination with DL techniques.

In some implementations, the DL technique can include a convolutional neural network (CNN) model. A CNN model is a DL model including nodes (e.g., artificial neurons) structured in a plurality of interconnected layers. A node can be used for outputting a value based on a plurality of input values; the function associates each input value with an independent weight that can be updated. The decision process of the CNN can be used for classification. For example, the bottom layer of the CNN can take initial input data, such as an image or components of the image, and the top layer of the CNN can output a label representing a decision made for the initial input data by the CNN, such as, for example, a category of the image, or whether a defect is detected for a component of the image, or the wafer or reticle defect pattern if a defect is detected.

Parameters of the CNN model can include, for example, a number of layers and values of parameters for each layer. During a supervised training method for the CNN model, for example, a set of data (e.g., a training set) can be used as inputs to the CNN model for classification. Input of the training set can be assigned with a pre-determined label (ground truth labels) for determining whether the classification of the CNN is correct. Based on the comparison of the output labels and ground truth labels, the weights of nodes can be updated for optimization. A CNN model trained by such a process can be used as a classifier for other input data of the same type with the training set. For example, the components ranked by significance can be used as inputs to the CNN model to determine whether the defect image is associated with a known defect type.

In some implementations, for operations 104 and 106, both the first processing unit (e.g., CPU) and the second processing unit (e.g., GPU) can be used by the computing device to determine the components ranked by significance and/or whether the defect image is associated with the known defect type. As discussed previously, using additional (and often idle) processing resources (e.g., GPU) optimized for image processing can help achieving better performance.

Additionally, in some implementations, image data other than defect images, or non-image data (e.g., pictures, photos, texts, sounds) can be used as objectives for defect classification using the above mentioned process.

Figure 2:
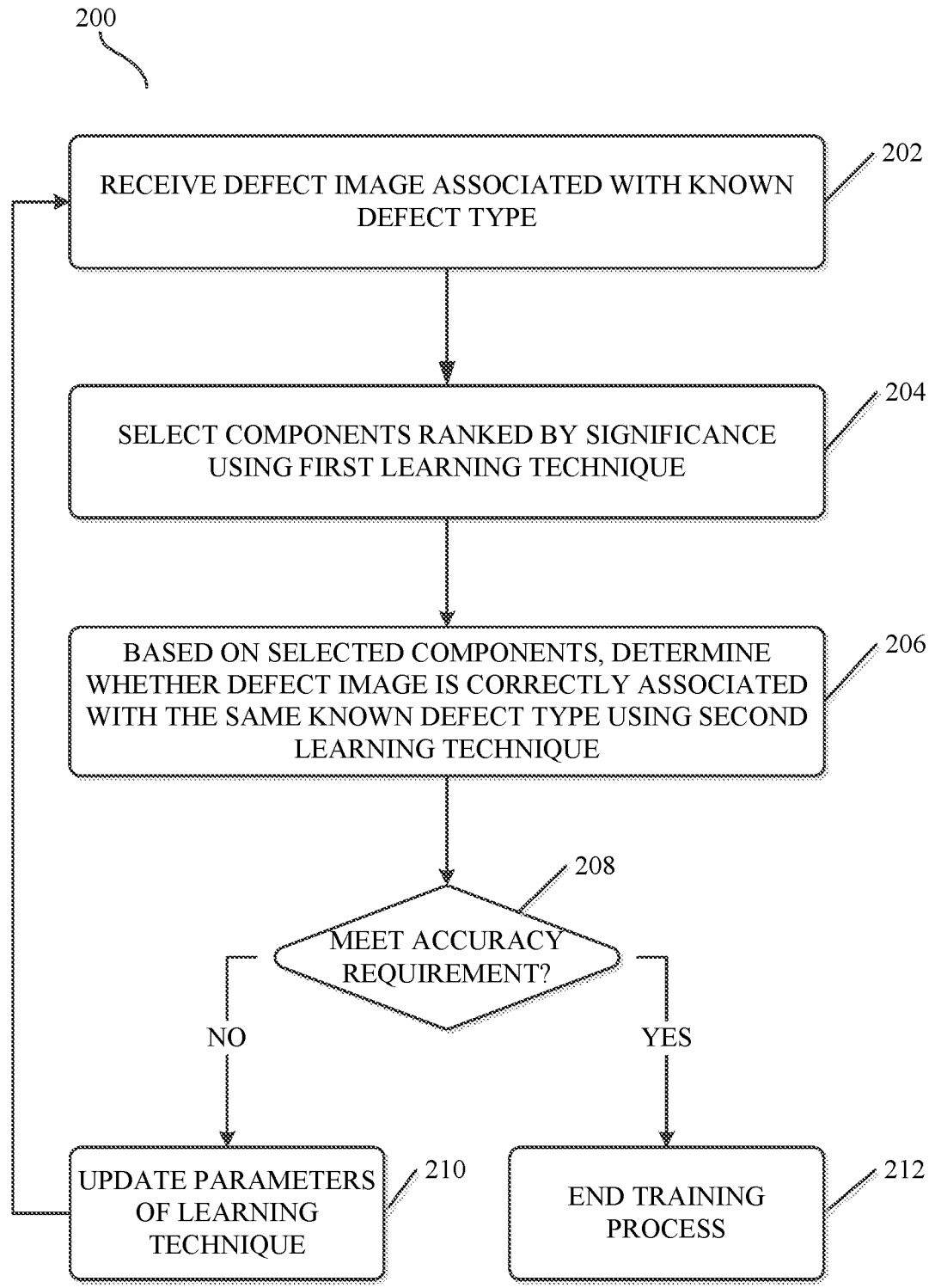
FIG. 2 is a flow diagram showing an example training process for learning based defect classification according to implementations of this disclosure.

FIG. 2 is a flow diagram showing an example training process for learning based defect inspection according to implementations of this disclosure. Training Process 200 can be performed by software modules (e.g., instructions or code) executed by a processor of a computer system, by hardware modules of the computer system, or combinations thereof. The computer system can include, for example, one or more computing devices. One or more operations described herein can be incorporated into, for example, wafer or reticle inspection products and be used by a semiconductor manufacturer.

The software modules can include machine-readable instructions that can be stored in a memory such as memory 401. The machine-readable instructions can be executed by a processor, such as CPU 402 or GPU 403, to cause the computing device to perform process 200. The one or more computing devices can be implemented as an apparatus included in the defect inspection system. Training process 200 can be implemented using specialized hardware or firmware. Some computing devices can have multiple memories, multiple processors, or both. For example, the operations of training process 200 can be distributed using different processors (such as CPU 402 and GPU 403). For simplicity of explanation, process 200 is depicted and described as a series of operations. However, operations in accordance with this disclosure can occur in various orders and/or concurrently. Additionally, operations in accordance with this disclosure may occur with other operations not presented and described herein. Furthermore, not all illustrated operations may be required to implement a method in accordance with the disclosed subject matter. The training process 200 depicted in FIG. 2 can be performed prior to, or as part of process 100 discussed in FIG. 1.

In some implementations, training process 200 can be used to accumulate knowledge for classifying defects for the defect inspection system, tune parameters for the learning techniques, and/or generate reusable models for the learning techniques. For example, generating the reusable models can include determining structures of the models as well as numbers, types, and values of the parameters of the models. Training process 200 can be implemented in iteration, and the iteration of process 200 will not stop until certain requirements are met (see, e.g., operation 208). In some implementations, the models used for training process 200 can include a DL model, such as a CNN model.

At operation 202, a defect image associated with a known defect type is received. Similar to operation 102, the defect image can be obtained from, for example, a defect record as a result of an inspection (such as an optical or an E-beam inspection) of a target specimen (such as a wafer or a reticle). The defect image can be received from the defect inspection system as the objective, which is used as input for the training process. The defect type associated with the defect image can be a known defect type (e.g., pre-determined by another classification process, or manually). The defect type can be used as a label for training the DL model, such as, for example, the CNN model as described above. The data used for training can be referred to as training data.

At operation 204 ("component selection stage"), components ranked by significance are selected from the defect image associated with the known defect type using the first learning technique, by a computing device. Similar to operation 104 in classification process 100, operation 204 can select the most significant components from the defect image. For example, in some implementations, the first learning technique can be a SVM model. In some implementations, the SVM model can include adjustable parameters, including, for example, the number of components to select.

At operation 206 ("knowledge development stage"), it is determined whether the defect image is correctly associated with the same known defect type based on the components ranked by significance, by the computing device using the second learning technique. A defect type can be determined for the defect image based on the components ranked by significance from operation 204, using the second learning technique (such as a DL technique). Similar to operation 106 in the classification process 100, operation 206 can use the components ranked by significance as inputs for the second learning technique, which can include, for example, a CNN model. Parameters of the CNN model can include, for example, a number of layers and values of parameters for each layer. Once determined, the defect type determined based the components ranked by signature can be compared with the known defect type of the defect image. When the defect type determined based on the components ranked by significance matches the known defect type, the defect image is correctly associated with the same known defect type. When the defect type determined based on the components ranked by significance does not match the known defect type, the defect image is not correctly associated with the same known defect type.

At operation 208, it is determined whether an accuracy requirement is met based on whether the defect image is correctly associated with the same known defect type. For example, a number of defect images can be used for training process 200 and a percentage of accuracy can be calculated based on how many defect images are correctly associated with the known defect type at operation 206. The accuracy requirement can be a requirement for an accuracy condition. The accuracy condition can be, for example, an accuracy rate, which is a ratio of a number of times that inputted defect images are correctly classified (e.g., associated with the known defect types) over a total number of the inputted defect images. Accordingly, the accuracy requirement can be, for example, exceeding a threshold of the accuracy rate. In some implementations, whether the accuracy requirement is met can be determined at operation 208 for each iteration of process 200 using the training data.

At operation 210, if the accuracy requirement is not met, parameters associated with the learning techniques can be updated (e.g., adjusted) such that the accuracy condition is expected to change toward meeting the accuracy requirement in the next iteration of training process 200. Based on the feedback (e.g., the accuracy requirement has been failed for a certain number of iterations of process 200), the parameters associated with the learning techniques can be updated either automatically, or manually by an individual. After updating the parameters, training process 200 can go back to operation 202 to receive a new defect image as a start for the next iteration.

At operation 210, if the accuracy requirement is met, training process 200 ends, and the trained learning techniques (e.g., the SVM model and the CNN model) are ready to be used in the defect inspection system to automatically classify different wafer or reticle defect patterns, such as for use in the classification process 100 of FIG. 1.

Figure 3A:
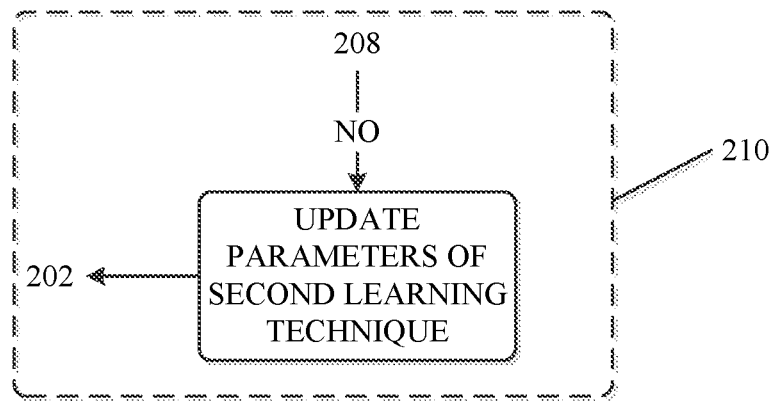
FIG. 3A is a diagram showing an example for updating parameters in the training process of FIG. 2 according to implementations of this disclosure.

In some implementations, as shown by an example in FIG. 3A, parameters associated with the second learning technique can be updated at operation 210. For example, in some implementations, if the accuracy rate is below the threshold, the parameters of the second learning technique, such as the parameters of the CNN model, can be updated so that in the next iteration of training process 200, with the updated parameters of the CNN model being used at operation 210, the accuracy rate can be expected to increase toward the threshold.

Figure 3B:
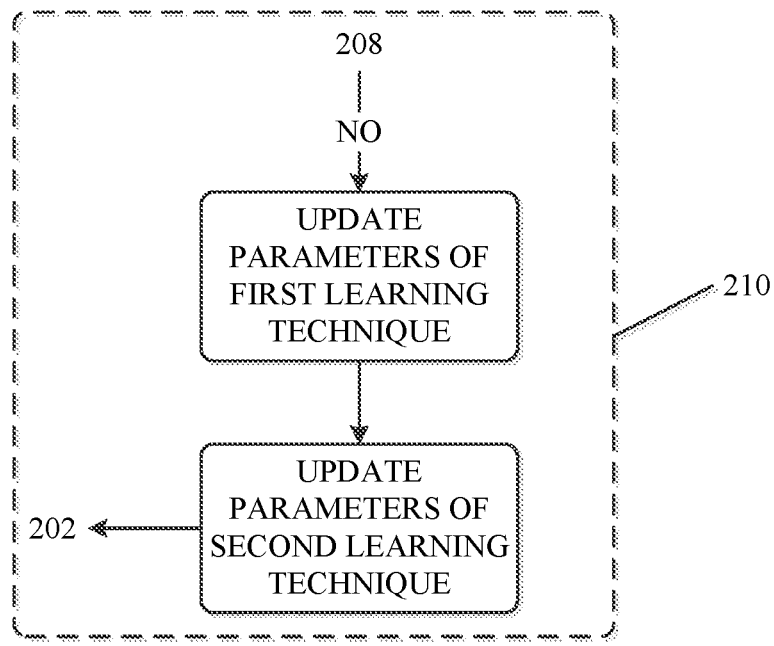
FIG. 3B is a flow diagram showing another example for updating parameters in the training process of in FIG. 2 according to implementations of this disclosure.

In some implementations, prior to updating the parameters associated with the second learning technique, as shown by an example in FIG. 3B, parameters associated with the first learning technique can also be updated. For example, if the accuracy requirement has not been met after updating the parameters of the second learning technique for a certain number of times during iterations of process 200, the parameters of the first learning technique can be updated or adjusted. For example, in some implementations, if the first learning technique is a SVM model, the SVM model can be updated by, for example, adjusting the number of components selected from the defect image. Accordingly, the parameters of the second learning technique can be adapted or updated to take the adjusted number of selected components as input. For another example, in some implementations, the weights of the components can be adjusted or updated, or the rank of significance can be updated. Accordingly, the parameters of the second learning technique can be updated by taking the adjusted list of selected components as input. Other ways for updating the parameters of the first learning technique can also be used.

In some implementations, training process 200 can include a testing stage. For example, during the testing stage, a set of testing data ("testing data set") can be used for the iteration of process 200 to test whether the accuracy requirement is met without performing operations 210-212, and after the testing stage, parameters of the learning techniques can be updated based on the accuracy requirement testing results determined from the testing stage. To avoid over-training or overfitting of the learning techniques, in some implementations, the testing data can be independent from the training data. For example, the testing data can include defect images obtained from the same inspection system which have never been used at operation 202. The defect images included in the testing data set associated with known defect types can be used as labels. In some implementations, cross-validation can be used to partition the labeled data for a better prediction performance. For example, the labeled data can be divided into a training set (which can be used for training) and a testing set (which can be used for validation) using techniques such as statistical sampling. In some implementations, the testing data set can include part or all of the training data. The testing stage, in some implementations, can be implemented as an intermediate stage of training process 200. For example, the testing stage can be periodically or randomly inserted into the iterations of process 200.

FIG. 4 is a diagram of an example defect inspection system 400 that can be used for learning based defect classification according to implementations of this disclosure. System 400 can be used for wafer or reticle inspection. Learning based defect classification can be implemented as an integral part of a wafer or reticle defection inspection system (e.g., system 400), or as a separate component. System 400 can include an apparatus such as a computing device, which can be implemented by any configuration of one or more computers, such as a microcomputer, a mainframe computer, a super computer, a general-purpose computer, a special-purpose/dedicated computer, an integrated computer, a database computer, a remote server computer, a personal computer, or a computing service provided by a computing service provider, e.g., a web host, or a cloud service provider. In some implementations, the computing device can be implemented in the form of multiple groups of computers that are at different geographic locations and can or cannot communicate with one another, such as by way of a network. While certain operations can be shared by multiple computers, in some implementations, different computers are assigned different operations.

The computing device can have an internal configuration of hardware including first processing unit 4022, second processing unit 4024, and memory 404. First processing unit 4022 can include at least one processing unit such as a central processing unit (CPU) or any other type of device, or multiple devices, capable of manipulating or processing information now-existing or hereafter developed. Second processing unit 4024 can include at least one graphics processing unit (GPU). Although the examples herein can be practiced with a single processing unit as shown, advantages in speed and efficiency can be achieved using more than one processing unit. For example, first processing unit 4022 and second processing unit 4024 can be distributed across multiple machines or devices (each machine or device having one or more of processing units) that can be coupled directly or across a local area or other network. Memory 404 can be a random access memory device (RAM), a read-only memory device (ROM), an optical disc, a magnetic disc, or any other suitable type of storage device. In some implementations, memory 404 can be distributed across multiple machines or devices such as network-based memory or memory in multiple machines performing operations that can be described herein as being performed using a single computer or computing device for ease of explanation. In some implementations, memory 404 can store codes and data that can be accessed by first processing unit 4022 and second processing unit 4024 using a bus. For example, memory 404 can include data 4042 that can be accessed by first processing unit 4022 and second processing unit 4024 using bus 412.

Memory 404 can also include operating system 4046 and installed applications 4044, applications 4044 including programs that permit first processing unit 4022 and second processing unit 4024 to implement instructions to generate control signals for performing functions of learning based defect classification for system 400 as described herein, such as classification process 100 and/or training process 200. System 400 can also include a secondary, additional or external storage 406, for example, a memory card, a flash drive, an external hard drive, an optical drive, or any other form of computer readable medium. In some implementations, applications 4044 can be stored in a whole or in part in storage 406 and loaded into memory 404 as needed for processing.

System 400 can include one or more output devices, such as output 408. Output 408 can be implemented in various ways, for example, it can be a display that can be coupled to system 400 and configured to display a rendering of video data. Output 408 can be any device transmitting a visual, acoustic, or tactile signal to the user, such as a display, a touch sensitive device (e.g., a touch screen), a speaker, an earphone, a light-emitting diode (LED) indicator, or a vibration motor. If output 408 is a display, for example, it can be a liquid crystal display (LCD), a cathode-ray tube (CRT), or any other output device capable of providing visible output to an individual. In some cases, an output device can also function as an input device—a touch screen display configured to receive touch-based input, for example.

Output 408 can alternatively or additionally be formed of a communication device for transmitting signals and/or data. For example, output 408 can include a wired mean for transmitting signals or data from system 400 to another device. For another example, output 408 can include a wireless transmitter using a protocol compatible with a wireless receiver to transmit signals from system 400 to another device.

System 400 can include one or more input devices, such as input 410. Input 410 can be implemented in various ways, such as a keyboard, a numerical keypad, a mouse, a microphone, a touch sensitive device (e.g., a touch screen), a sensor, or a gesture-sensitive input device. Any other type of input device, including an input device not requiring user intervention, is possible. For example, input 410 can be a communication device such as a wireless receiver operating according to any wireless protocol for receiving signals. Input 410 can output signals or data, indicative of the inputs, to system 400, e.g., along bus 412.

Optionally, system 400 can be in communication with another device using a communication device, such as communication device 414, via a network, such as network 416. Network 416 can be one or more communications networks of any suitable type in any combination, including, but not limited to, networks using Bluetooth communications, infrared communications, near field connections (NFC), wireless networks, wired networks, local area networks (LAN), wide area networks (WAN), virtual private network (VPN), cellular data networks and the Internet. Communication device 414 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to system 400 using bus 412 to provide functions of communication with network 416.

System 400 can communicate with a wafer or reticle inspection equipment. For example, system 400 can be coupled to one or more wafer or reticle inspection equipment configured to generate wafer or reticle inspection results (e.g., defect records or reports).

System 400 (and algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of system 400 do not necessarily have to be implemented in the same manner.

In some implementations, system 400 can be implemented using general purpose computers/processors with a computer program that, when executed, carries out any of the respective methods, algorithms and/or instructions described herein. Additionally or alternatively, for example, special purpose computers/processors can be utilized which can contain specialized hardware for carrying out any of the methods, algorithms, or instructions described herein.

The aspects herein can be described in terms of functional block components and various processing operations. Such functional blocks can be realized by any number of hardware and/or software components that perform the specified functions. For example, the described aspects can employ various integrated circuit components, e.g., memory elements, processing elements, logic elements, look-up tables, and the like, which can carry out a variety of functions under the control of one or more microprocessors or other control devices. Similarly, where the elements of the described aspects are implemented using software programming or software elements the disclosure can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the aspects of the disclosure could employ any number of conventional techniques for electronics configuration, signal processing and/or control, data processing and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the disclosure can be implemented using machine readable instructions in the form of code for operation of any or any combination of the aforementioned computational hardware. Computational code can be implemented in the form of one or more modules by which individual or combined functions can be performed as a computational tool, the input and output data of each module being passed to/from one or more further module during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

While the disclosure has been described in connection with certain implementations and implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

All references, including publications, patent applications, and patents, cited herein are hereby incorporated by reference to the same extent as if each reference were individually and specifically indicated as incorporated by reference and were set forth in its entirety herein.

What is claimed is:

1. A method of classifying defects for a defect inspection system, comprising:
 receiving an image based on an inspection of a target specimen, the image including a defect and the image comprising components;
 selecting, by a computing device using a first processing unit, most significant components of the components, wherein
 a support vector machine (SVM) learning system determined, during a training process, respective weights for at least some of the components, and the most significant components being the components having the highest determined weights, and a first number of most significant components is smaller than a second number of components; and
inputting the most significant components to a neural-network based image classifier to obtain a defect type of the defect.

2. The method of claim 1, wherein the computing device comprises the first processing unit and a second processing unit, and wherein the first processing unit comprises a central processing unit (CPU), and the second processing unit comprises a graphics processing unit (GPU).

3. The method of claim 2, wherein the target specimen comprises a wafer, and the each component comprises a pixel of the image and a position of the pixel, and the pixel is associated with at least one of an edge in the image, a corner in the image, a segment in the image, and a region of the image.

4. The method of claim 1, further comprising:
receiving a defect image associated with a known defect type during the training process;
selecting, by the computing device, components ranked by significance from the defect image associated with the known defect type using the first learning technique;
determining, by the computing device using the second learning technique, whether the defect image is correctly associated with the same known defect type based on the components ranked by significance selected from the defect image associated with the known defect type;
determining whether an accuracy requirement is met based on whether the defect image is correctly associated with the same known defect type; and
based on a determination that the accuracy requirement is not met, updating parameters associated with the second learning technique.

5. The method of claim 4, wherein the accuracy requirement comprises a threshold of accuracy rate.

6. The method of claim 4, further comprising:
based on the determination that the accuracy requirement is not met, updating parameters associated with the first learning technique before updating the parameters associated with the second learning technique.

7. The method of claim 1, wherein a significance value is indicative of at least one of a probability of a defect occurring in the each component or a relevancy of the each component for defect classification.

8. The method of claim 1, wherein the first number of most significant components is 10.

9. A non-transitory computer-readable medium storing instructions for defect classification of a defect inspection system, which when executed by a computer system using a first processing unit become operational with the first processing unit for classify defects for a defect inspection system, the non-transitory computer-readable medium comprising instructions to:
receive an image from the defect inspection system based on an inspection of a target specimen, the image including a defect and the image comprising components;
select N components of the components, wherein
a first learning system determined, during a training process, respective significance values for at least some of the components, and
the N components being the components having the highest determined significance values, wherein a significance value of each component is indicative of at least one of a probability of a defect occurring in the each component and relevancy of the each component for defect classification, and N is an integer smaller than a total number of the components; and
determine whether the image comprises a defect of a known defect type based on the N components using a second learning system.

10. The non-transitory computer-readable medium of claim 9, wherein the target specimen comprises a wafer, and the each component comprises a pixel of the image and a position of the pixel, and the pixel is associated with at least one of an edge in the image, a corner in the image, a segment in the image, and a region of the image.

11. The non-transitory computer-readable medium of claim 9, wherein the first learning system comprises a support vector machine (SVM) technique, and the second learning system comprises a deep learning (DL) technique.

12. The non-transitory computer-readable medium of claim 11, wherein the instructions to determine whether the image comprises the defect of the known defect type further comprise instructions which when executed by a CPU and a GPU become operational with the CPU and the GPU to:
in accordance with a rank of weighted significance values of the total number of components, select the N components as components having top-N weighted significance values in the rank;
input the N components to a neural-network based image classifier, wherein the neural-network based image classifier outputs data indicative of known defect types; and
determine whether the image comprises the defect of the known defect type based on the data.

13. The non-transitory computer-readable medium of claim 9, further comprising instructions to:
receive a defect image associated with a known defect type during the training process;
select components ranked by significance from the defect image associated with the known defect type using the first learning system;
determine, using the second learning system, whether the defect image is correctly associated with the same known defect type based on the components ranked by significance selected from the defect image associated with the known defect type;
determine whether an accuracy requirement is met based on whether the defect image is correctly associated with the same known defect type; and
based on a determination that the accuracy requirement is not met, update parameters associated with the second learning system.

14. The non-transitory computer-readable medium of claim 13, further comprising instructions to:
based on the determination that the accuracy requirement is not met, update parameters associated with the first learning system before updating the parameters associated with the second learning system.

15. A defect inspection system, comprising:
a first processing unit;
a second processing unit; and
a memory coupled to the first and the second processing units, the memory configured to store a set of instructions which when executed by the first and the second processing units become operational with the first and the second processing units to:

receive, using the first processing unit, a defect record based on an inspection of a target specimen, the defect record comprising a defect image associated with an unknown defect;

select, using the first processing unit, components ranked by significance from the defect image using a support vector machine (SVM)), wherein the components ranked by significance are determined using both the first processing unit and the second processing unit; and determine, using both the first processing unit and the second processing unit, whether the defect image is associated with a known defect type based on the components ranked by significance using a deep learning system.

16. The system of claim 15, wherein the first processing unit comprises a central processing unit (CPU), and the second processing unit comprises a graphics processing unit (GPU).

17. The system of claim 15, wherein the memory is further configured to store a set of instructions which when executed by the first and the second processing units become operational with the first and the second processing units to:

receive a defect image associated with a known defect type during a training process;

select components ranked by significance from the defect image associated with the known defect type using the first learning technique;

determine, using the second learning technique, whether the defect image is correctly associated with the same known defect type based on the components ranked by significance selected from the defect image associated with the known defect type;

determine whether an accuracy requirement is met based on whether the defect image is correctly associated with the same known defect type; and based on a determination that the accuracy requirement is not met, update parameters associated with the second learning technique.

18. The system of claim 17, wherein the memory is further configured to store a set of instructions which when executed by the first and the second processing units become operational with the first and the second processing units to:

based on the determination that the accuracy requirement is not met, update parameters associated with the first learning technique before updating the parameters associated with the second learning technique.

19. The apparatus of claim 17, wherein the accuracy requirement comprises a threshold ratio of times of the CNN correctly classifying the defect type.

* * * * *